(12) United States Patent
Watarai

(10) Patent No.: US 8,610,801 B2
(45) Date of Patent: Dec. 17, 2013

(54) IMAGE PROCESSING APPARATUS INCLUDING CHROMATIC ABERRATION CORRECTING CIRCUIT AND IMAGE PROCESSING METHOD

(75) Inventor: Yuji Watarai, Kasugai (JP)

(73) Assignee: Fujitsu Semiconductor Limited, Yokohama (JP)

( * ) Notice: Subject to any disclaimer, the term of this patent is extended or adjusted under 35 U.S.C. 154(b) by 406 days.

(21) Appl. No.: 12/638,210

(22) Filed: Dec. 15, 2009

(65) Prior Publication Data

US 2010/0214446 A1    Aug. 26, 2010

(30) Foreign Application Priority Data

Feb. 23, 2009 (JP) .................................. 2009-38812

(51) Int. Cl.
*H04N 5/217* (2011.01)
*H04N 9/67* (2006.01)

(52) U.S. Cl.
USPC .......................................... 348/241; 348/336

(58) Field of Classification Search
USPC ................................. 348/224.1, 241, 251, 336
See application file for complete search history.

(56) References Cited

U.S. PATENT DOCUMENTS

| 6,747,766 | B1 | 6/2004 | Kamisuwa et al. | |
| 7,227,574 | B2 | 6/2007 | Yamanaka | |
| 7,245,319 | B1 | 7/2007 | Enomoto | |
| 7,865,031 | B2 * | 1/2011 | Bushell et al. | 382/274 |
| 7,995,108 | B2 * | 8/2011 | Utsugi | 348/222.1 |
| 2004/0150732 | A1 | 8/2004 | Yamanaka | |
| 2004/0247201 | A1 * | 12/2004 | Arazaki | 382/275 |
| 2009/0128670 | A1 * | 5/2009 | Noh | 348/241 |

FOREIGN PATENT DOCUMENTS

| JP | 05-003568 A | 1/1993 |
| JP | 06-113309 A | 4/1994 |
| JP | 2000-069343 A | 3/2000 |
| JP | 2000-299874 A | 10/2000 |
| JP | 2002-112046 A | 4/2002 |
| JP | 2004-241991 A | 8/2004 |

OTHER PUBLICATIONS

Japanese Office Action dated Nov. 13, 2012.
Japanese Office Action dated Apr. 2, 2013.

* cited by examiner

*Primary Examiner* — Joel Fosselman
(74) *Attorney, Agent, or Firm* — Arent Fox LLP

(57) ABSTRACT

An image processing apparatus includes an image pickup circuit that performs photoelectric conversion on an optical image, and a chromatic aberration correcting circuit that calculates an amount of shift by chromatic aberration based on a linear function to perform chromatic aberration correction on captured image data in accordance with the amount of shift. The chromatic aberration correcting circuit performs the chromatic aberration correction on a first pixel in a first area including an optical center of the captured image data with a first linear function using a distance from the optical center, and performs the chromatic aberration correction on a second pixel in a second area that does not include the optical center and that is different from the first area with a second linear function using the distance from the optical center.

15 Claims, 17 Drawing Sheets

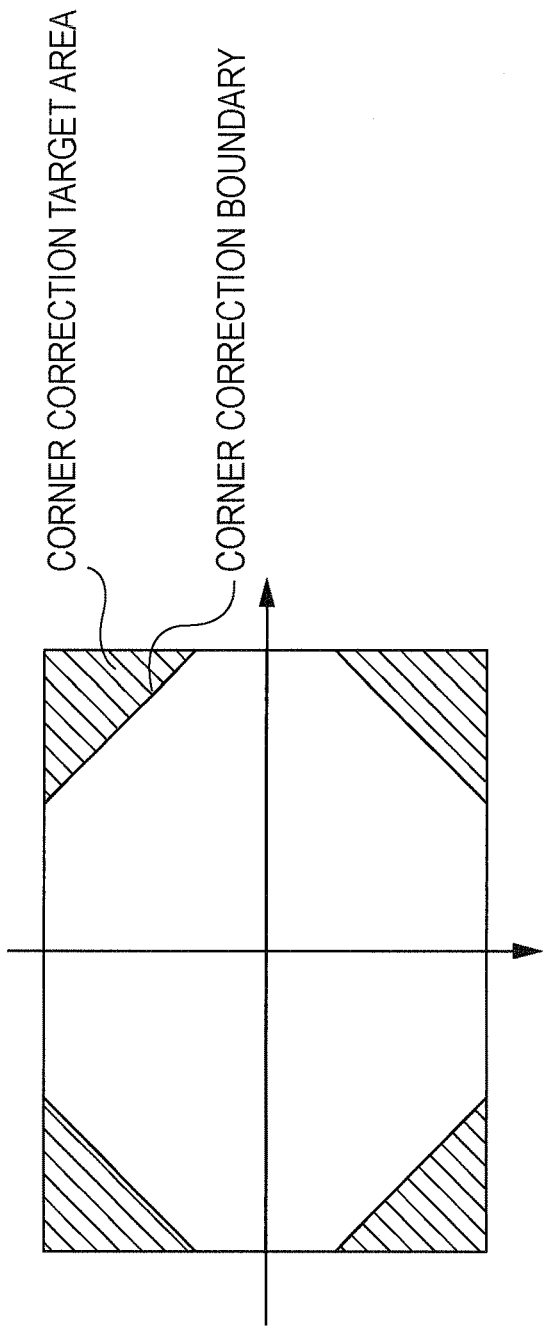

IMAGE PROCESSING APPARATUS INCLUDING CHROMATIC ABERRATION CORRECTING CIRCUIT AND IMAGE PROCESSING METHOD

CROSS-REFERENCE TO RELATED APPLICATIONS

This application claims the benefit of priority from Japanese Patent Application No. 2009-38812 filed on Feb. 23, 2009, the entire contents of which are incorporated herein by reference.

BACKGROUND

1. Field

Embodiments discussed herein relates to an image processing apparatus performing chromatic aberration correction.

2. Description of Related Art

Imaging errors, called aberrations, occur in still cameras and video cameras using lenses. Because the refractive index of each glass lens is varied depending on wavelengths, the imaging position is varied depending on colors. In result, Chromatic aberration, which is one of the imaging errors, occurs. The chromatic aberration includes longitudinal chromatic aberration, and lateral chromatic aberration. Magnifications varies depending on imaging positions in the lateral chromatic aberrations. Therefore, the magnification is increased as the waveform is sequentially increased in order of blue, green, and red, to peripheral parts away from the optical center (optical axis).

Related technologies are discussed in, for example, Japanese Laid-open Patent Publication No. H5-3568, Japanese Laid-open Patent Publication No. H6-113309, Japanese Laid-open Patent Publication No. 2000-69343, and Japanese Laid-open Patent Publication No. 2004-241991.

SUMMARY

According to one aspect of the embodiments, an image processing apparatus is provided which includes an image pickup circuit that performs photoelectric conversion on an optical image and a chromatic aberration correcting circuit that calculates an amount of shift by chromatic aberration based on a linear function to perform chromatic aberration correction on captured image data in accordance with the amount of shift. The chromatic aberration correcting circuit performs the chromatic aberration correction on a first pixel in a first area including an optical center of the captured image data with a first linear function using a distance from the optical center, and performs the chromatic aberration correction on a second pixel in a second area that does not include the optical center and that is different from the first area with a second linear function using the distance from the optical center.

Additional advantages and novel features of the invention will be set forth in part in the description that follows, and in part will become more apparent to those skilled in the art upon examination of the following, or upon learning by practice of the invention.

BRIEF DESCRIPTION OF THE DRAWINGS

FIG. 10 illustrates exemplary corner correction target areas;

DESCRIPTION OF THE EMBODIMENTS

Figure 1A:
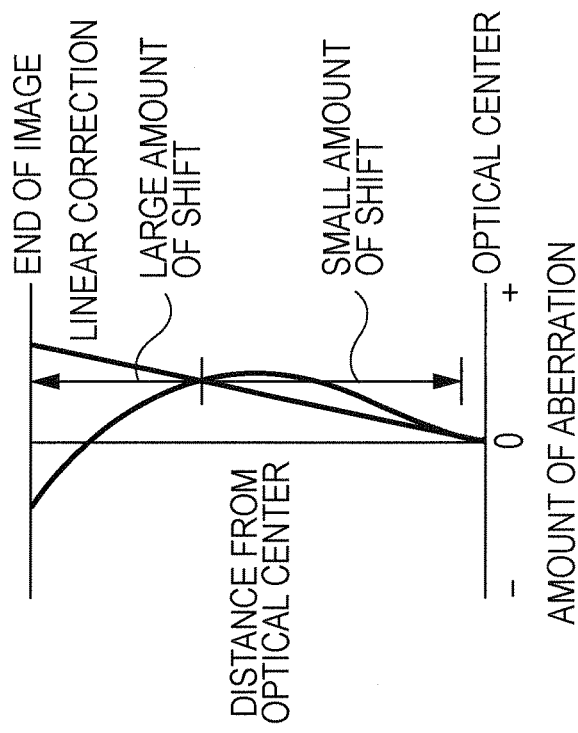
FIGS. 1A and 1B illustrate an exemplary relationship between a distance from an optical center and an amount of aberration.
Figure 1B:
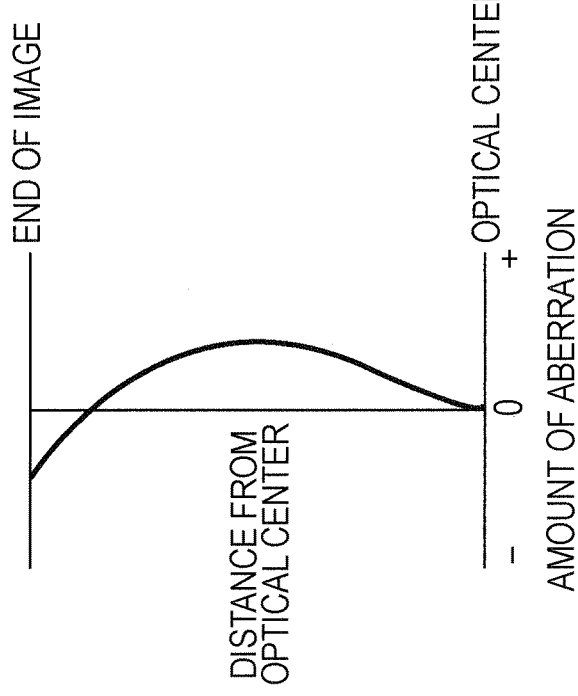

FIG. 1 illustrates an exemplary relationship between the distance from the optical center and the amount of aberration (e.g. the amount of shift caused by lateral chromatic aberration). FIG. 1A illustrates an exemplary amount-of-aberration characteristic curve, and FIG. 1B illustrates an exemplary linear correction characteristic curve. In FIG. 1A, since the lens optical system is symmetrical about the optical axis, the amount of shift caused by the lateral chromatic aberration depends on the distance from the optical center. The shape of the amount-of-aberration characteristic curve, illustrated in FIG. 1A, is varied depending on the structure of the lens. For example, the amount-of-aberration characteristic curve, illustrated in FIG. 1A, may have a non-linear shape.

For example, when calculating the amount of shift by approximating the amount-of-aberration characteristic curve using a linear function whose parameter is the distance from the optical center the amounts of aberration of pixels relatively apart from the optical center are shifted from the actual amounts of aberration, as illustrated in FIG. 1B. The lateral chromatic aberration in parts near the four corners of the image, apart from the optical center, may not be appropriately corrected.

Figure 2:
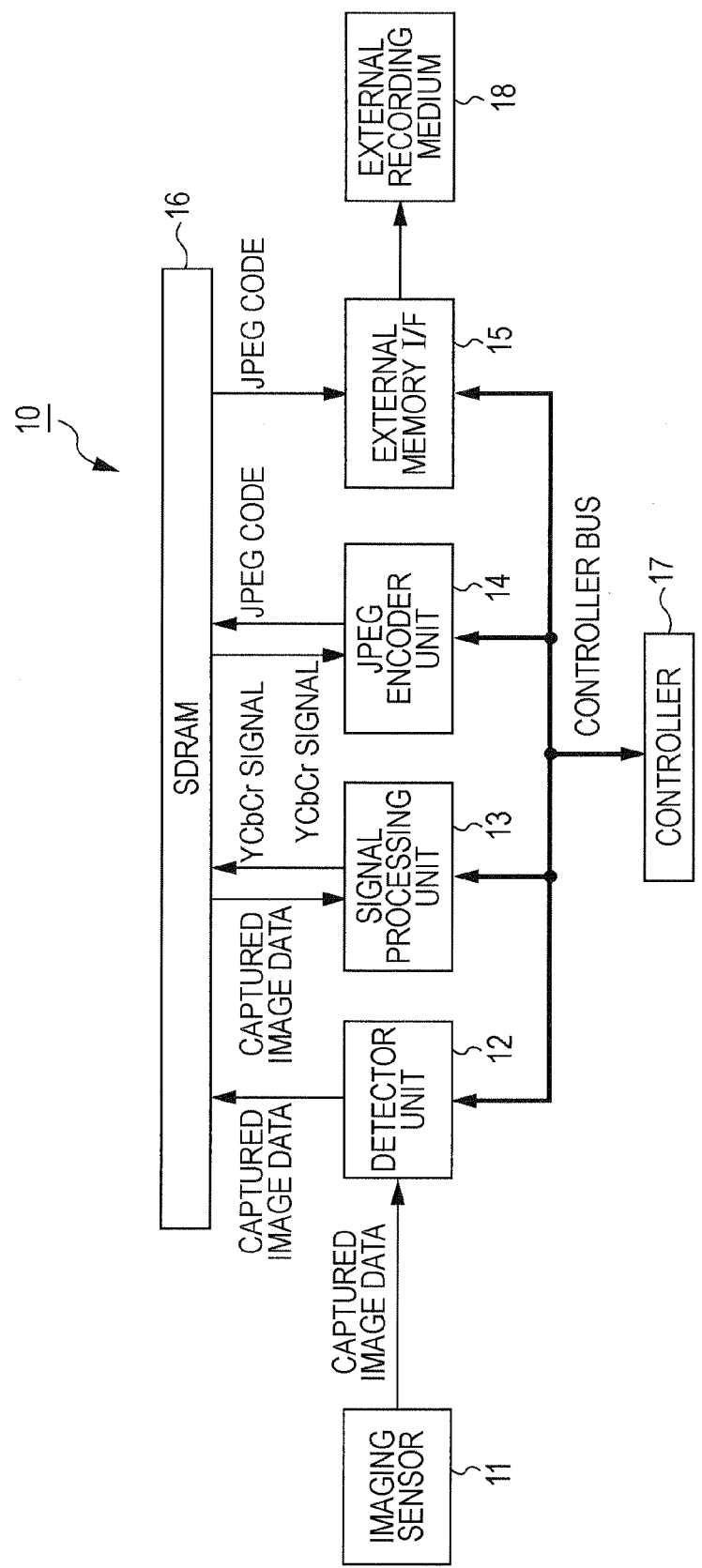
FIG. 2 illustrates an exemplary digital camera.

FIG. 2 illustrates an exemplary digital camera. A digital camera 10 includes an imaging sensor 11, a detector unit 12, a signal processing unit 13, a Joint Photographic Experts Group (JPEG) encoder 14, an external memory interface 15, a synchronous dynamic random access memory (SDRAM) 16, a controller 17, and an external recording medium 18. The external recording medium 18 may include a portable memory card, such as a CompactFlash (CF) card, or a secure digital (SD) memory card.

The imaging sensor 11 includes, for example, a charge coupled device (CCD) image sensor or a complementary metal oxide semiconductor (CMOS) image sensor including multiple pixels that are horizontally and vertically arranged in a planar form. The imaging sensor 11 converts a light incident from an object through an optical lens, etc. into an electrical signal at each pixel, and converts the electrical signal into a digital signal in an analog-to-digital converter (not illustrated) to generate captured image data. The imaging sensor 11 stores the captured image data in the SDRAM 16 through the detector 12. The color image pickup method includes a single-plate method in which one image pickup device is used to generate RGB signals, and a three-plate method in which three image pickup devices are used to generate RGB signals. Either one may be adopted in the imaging sensor 11.

The imaging sensor 11 sequentially vertically transfers the electrical signal of each pixel on horizontal lines, and sequentially horizontally transfers the electrical signal of each pixel, which has been transferred to an vertical end, to output the captured image data of the entire image. The multiple pixels included in the imaging sensor 11 may include a Bayer array through an RGB filter. For example, the captured image data is acquired as data in the Bayer array (Bayer data). The value of each pixel, which is the feature value of each pixel forming the captured image data, is associated with one of red (R), green (G), and blue (B). The detector unit 12 acquires an evaluation value from the entire image through the captured image data.

In the data in the Bayer array (Bayer data), the G pixels, to which luminance signals greatly contribute, are arranged in a checkered pattern and the R and B pixels are arranged in a grid pattern in the remaining part, where the G pixels are not arranged. Each G component adjacent to the R pixel is denoted by Gr and each G component adjacent to the B pixel is denoted by Gb.

The signal processing unit 13 receives the captured image data stored in the SDRAM 16 and interpolates the captured image data to convert the captured image data into a YCbCr signal. The signal processor 13 performs noise reduction, edge enhancement, filter processing including color conversion, conversion of the resolution of images, and so on, in accordance with image processing parameters. The signal processor 13 stores the resulting YCbCr signal in the SDRAM 16.

The JPEG encoder 14 receives the YCbCr signal stored in the SDRAM 16 to convert the YCbCr signal into a JPEG code and stores the JPEG code in the SDRAM 16. The external memory interface 15 coupled to the external recording medium 18 supplies the JPEG code stored in the SDRAM 16 to the external recording medium 18.

The controller 17 is electrically coupled to the detector 12, the signal processor 13, the JPEG encoder 14, and the external memory interface 15 via a controller bus to control the operations, etc., of these components. In addition, the controller 17 changes the image capturing conditions, for example, controls zooming with a zoom lens.

A chromatic aberration correcting portion calculates the amount of shift caused by the chromatic aberration in an imaging optical system based on multiple linear functions, and performs chromatic aberration correction on the captured image data in accordance with the amount of shift. The chromatic aberration correcting portion may be included in the signal processing unit 13.

Figure 3:
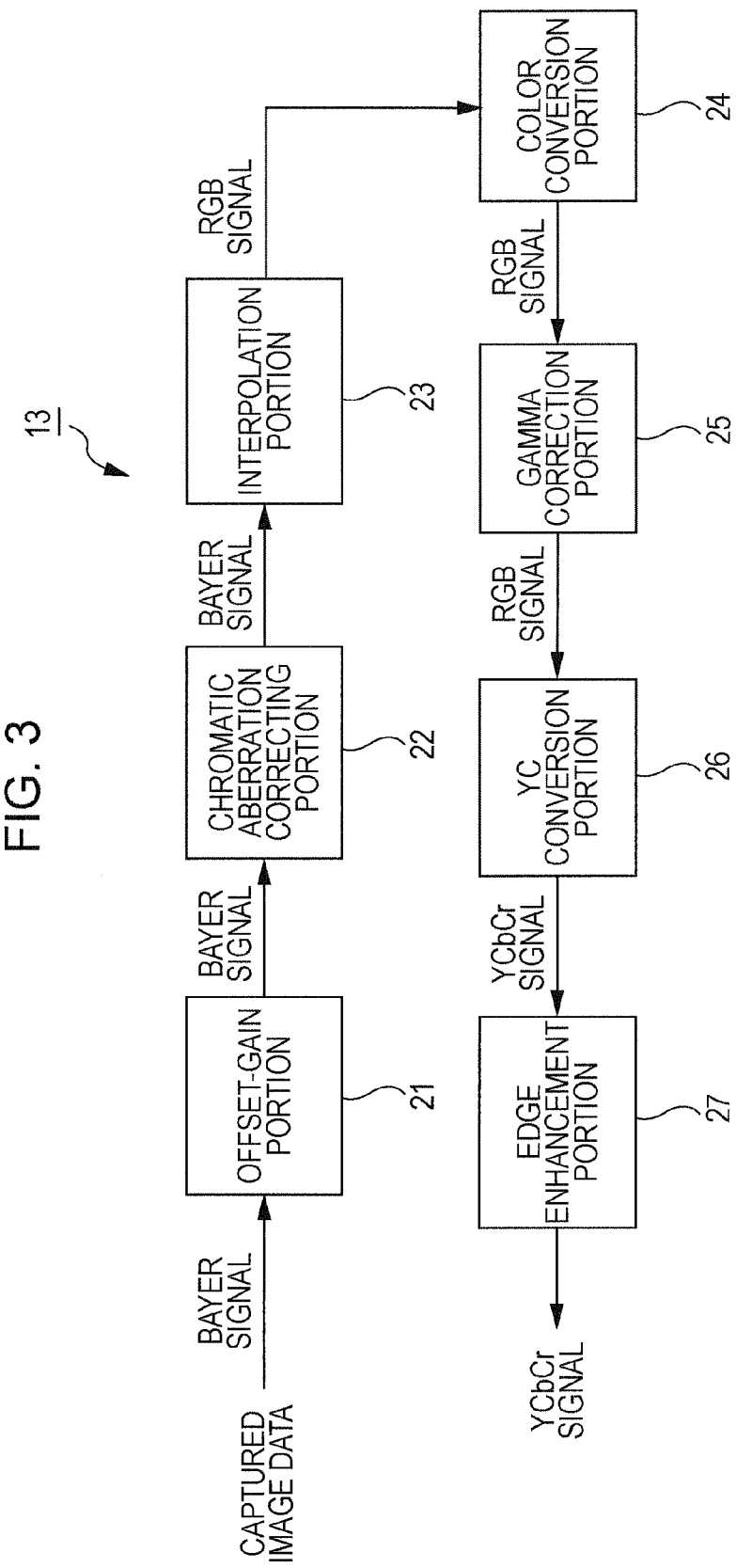
FIG. 3 illustrates an exemplary signal processor.

FIG. 3 illustrates an exemplary signal processor. The signal processor illustrated in FIG. 3 may be the signal processor 13 in FIG. 2. The signal processor 13 includes an offset-gain portion 21, a chromatic aberration correcting portion 22, an interpolation portion 23, a color conversion portion 24, a gamma correction portion 25, a YC conversion portion 26, and an edge enhancement portion 27.

The offset-gain portion 21 adjusts the offset levels of the Gr components adjacent to the R pixels and the Gb components adjacent to the B pixels to remove a horizontal stripe component appearing in each line. The interpolation portion 23 performs demosaicing, for example, performs pixel interpolation. The color conversion portion 24 varies the balance between the RGB signals to perform color conversion. The gamma correction portion 25 performs gamma correction. The YC conversion portion 26 converts the RGB signal into a YCbCr signal. The edge enhancement portion 27 enhances edges in order to improve the sharpness of the entire image.

The chromatic aberration correcting portion 22 included in the signal processing unit 13 performs the chromatic aberration correction on each target pixel in a first area and a second area on the image plane of the captured image data by using a first linear function and a second linear function. The first area is relatively near the optical center, and the second area is away from the optical center and is provided in circumferential parts of the image plane. The first linear function and the second linear function each may include a function to calculate the chromatic aberration by using the distance from the optical center as a parameter. The first linear function and the second linear function each may be a linear function having gain factors, such as gradients, indicating the relationship between the distance from the optical center and the chromatic aberration.

In the signal processor illustrated in FIG. 3, the Bayer data is supplied to the chromatic aberration correcting portion 22 where the chromatic aberration correction is performed on RAW data that has not been subjected to the demosaicing, for example, the pixel interpolation in the interpolation portion 23. For example, the chromatic aberration correcting portion 22 may be provided downstream of the interpolation portion 23 and the chromatic aberration may be performed on data subjected to the demosaicing.

Figure 4:
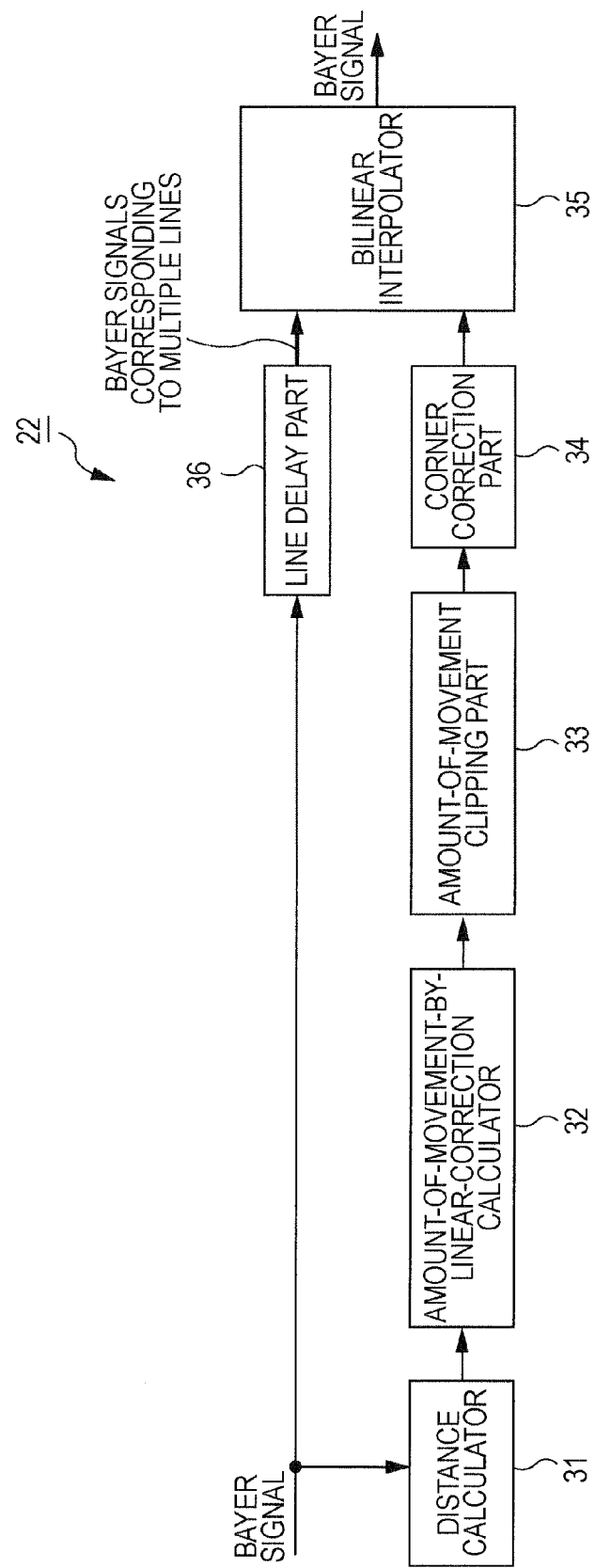
FIG. 4 illustrates an exemplary chromatic aberration correcting portion.

FIG. 4 illustrates an exemplary chromatic aberration correcting portion. The chromatic aberration correcting portion illustrated in FIG. 4 may be the chromatic aberration correcting portion 22 in FIG. 3. The chromatic aberration correcting portion 22 includes a distance calculator 31, an amount-of-movement-by-linear-correction calculator 32, an amount-of-movement clipping part 33, a corner correction part 34, a bilinear interpolator 35, and a line delay part 36.

Figure 5:
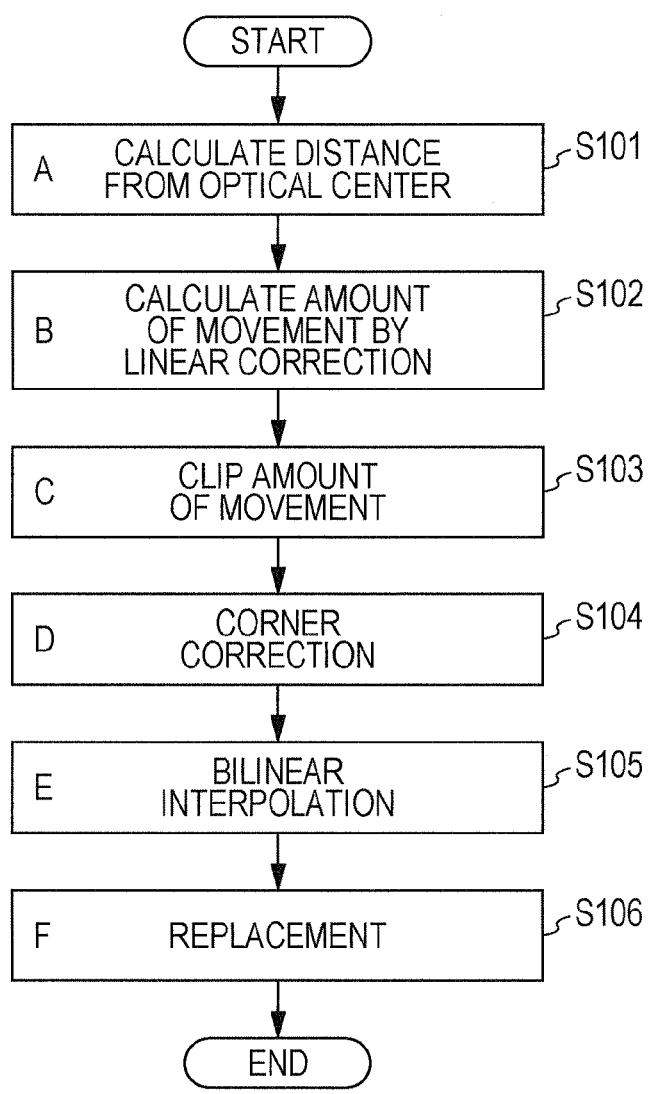
FIG. 5 illustrates an exemplary chromatic aberration correcting process.
Figure 6:
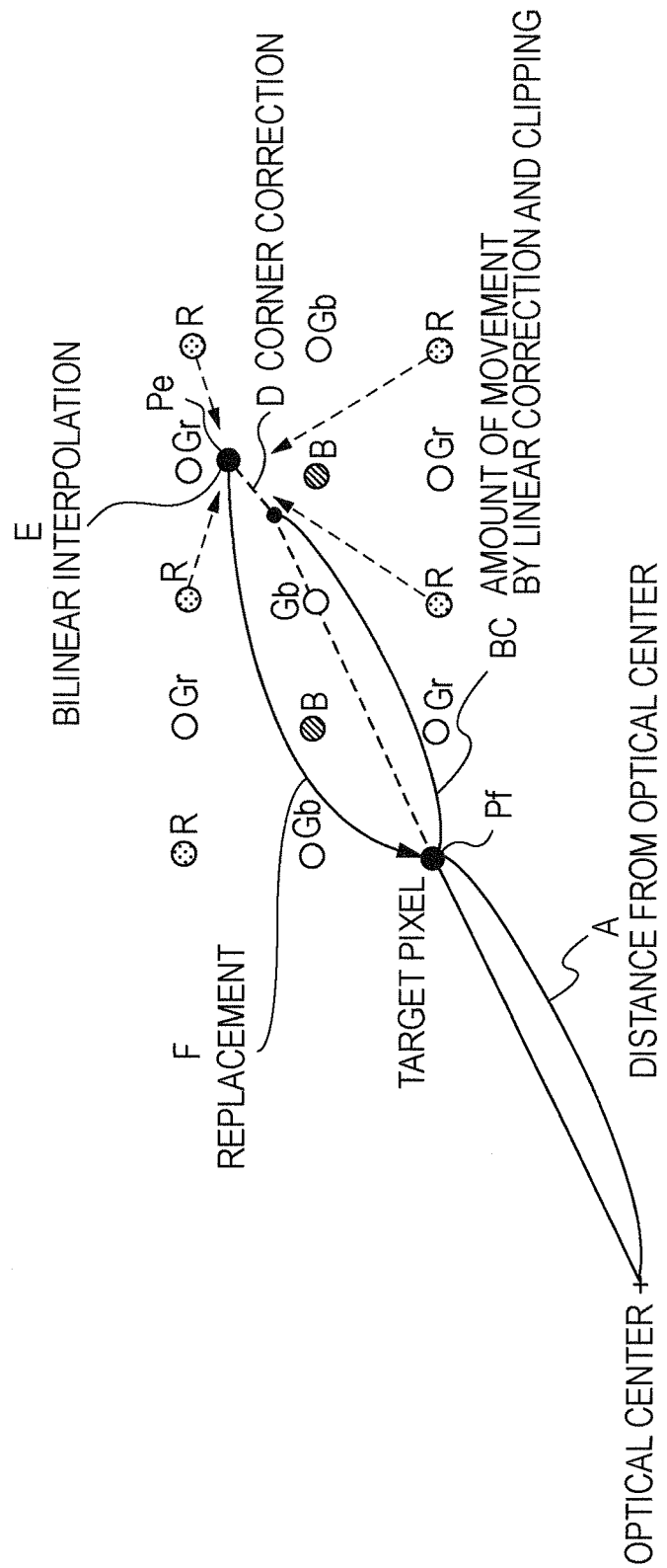
FIG. 6 illustrates another exemplary chromatic aberration correcting process.

FIG. 5 illustrates an exemplary chromatic aberration correcting process. The chromatic aberration correcting process in FIG. 5 may be performed by the chromatic aberration correcting portion illustrated in FIG. 4. FIG. 6 illustrates another exemplary chromatic aberration correcting process. In operation S101, the distance calculator 31 calculates the horizontal and vertical distances from the optical center to a target pixel. The calculation in the chromatic aberration correcting process may be performed in an orthogonal coordinate system having horizontal and vertical directions.

Figure 7:
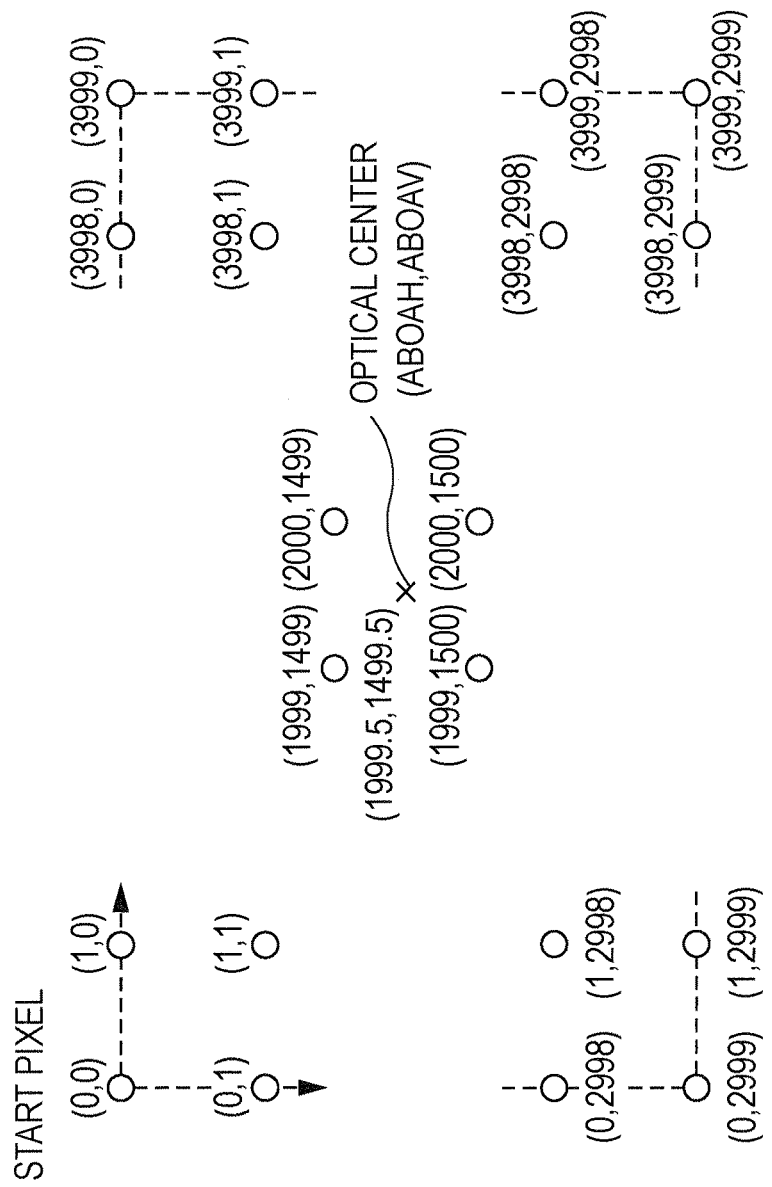
FIG. 7 illustrates an exemplary setting of an optical center.

A coordinate (ABOAH, ABOAV) of the optical center is determined to calculate the distances. In the coordinate system, the upper left corner of the entire image may be set as an origin. FIG. 7 illustrates an exemplary setting of an optical center. In FIG. 7, for example, the optical center of 4,000×3,000 Bayer data is set. If the upper left corner of the image is set as the origin (0, 0) and the center of the image is set as the optical center, the coordinate (ABOAH, ABOAV) of the optical center is (1999.5, 1499.5).

The distance from the optical center to the target pixel is calculated according to Equations (1) and (2):

Horizontal distance from optical center to target pixel = $cpH - ABOAH$ (1)

Vertical distance from optical center to target pixel = $cpV - ABOAV$ (2)

where (cpH, cpV) denotes the internal coordinate of the target pixel.

Referring back to FIG. 5, in operation S102, the amount-of-movement-by-linear-correction calculator 32 calculates the horizontal amount of movement by the linear correction, and the vertical amount of movement by the linear correction, using the first linear function. The first linear function may include a function using the distance from the optical center as a parameter, and may be defined by gain factors (gradients). Related parameters used in the calculation of the amount of movement by the linear correction are as follows:

Gain factor for R pixels in chromatic aberration correction=ABGAR

Gain factor for Gr/GB pixels in chromatic aberration correction=ABGAG

Gain factor for B pixels in chromatic aberration correction=ABGAB (First Related Parameter Group)

Figure 8:
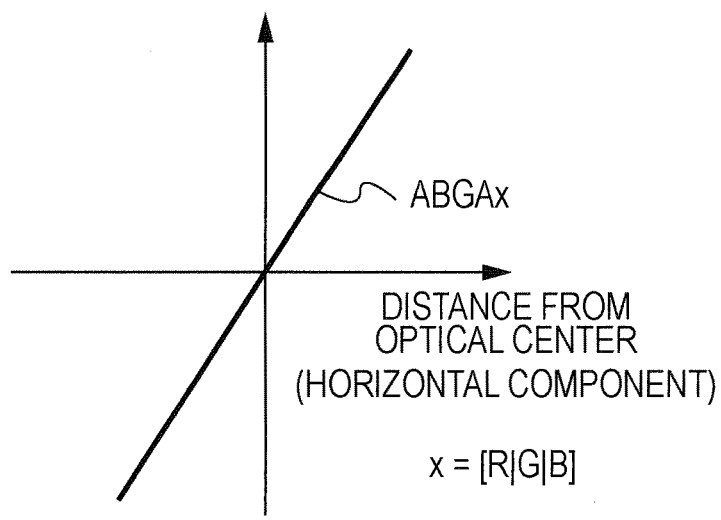
FIG. 8 illustrates an exemplary amount of movement by linear correction.

FIG. 8 illustrates an exemplary amount of movement by a linear correction. A gain factor (gradient) ABGAx: x=[R|G|B] of the first linear function is illustrated in FIG. 8.

The amount of movement by the linear correction is calculated by multiplying the horizontal component of the distance from the optical center by the gain factor ABGAx: x=[R|G|B], and multiplying the vertical component of the distance from the optical center by the gain factor ABGAx: x=[R|G|B], as illustrated in Equations (3) and (4):

Horizontal component of amount of movement by linear correction=$(cpH-ABOAH) \times ABGAx \times = [R|G|B]$ (3)

Vertical component of amount of movement by linear correction=$(cpV-ABOAV) \times ABGAx \times = [R|G|B]$ (4)

Referring back to FIG. 5, in operation S103, the amount-of-movement clipping part 33 divides the first area into two subareas by using a borderline drawn between the optical center, and the boundary between the first area and the second area. The amount of movement by the correction (e.g. the amount of shift) of a target pixel in the subarea toward the second area, among the two subareas, is set to a substantially constant value.

If the horizontal distance from the optical center to the target pixel, and the vertical distance from the optical center to the target pixel, exceed horizontal upper and lower limits (horizontal threshold values) and vertical upper and lower limits (vertical threshold values), respectively, it is determined that the target pixel is in the subarea toward the second area, among the two subareas in the first area. The amounts of horizontal movement and vertical movement by the correction (the amounts of shift), of the target pixel, are set as the amounts of shift relative to the horizontal upper and lower limits (horizontal threshold values) and the vertical upper, and lower limits (vertical threshold values) horizontally and vertically which are calculated based on the first linear function.

Related parameters used in the clipping of the amount of movement are as follows:

Horizontal upper limit of R pixels in chromatic aberration correction=ABLRHU;

Horizontal lower limit of R pixels in chromatic aberration correction=ABLRHL;

Vertical upper limit of R pixels in chromatic aberration correction=ABLRVU;

Vertical lower limit of R pixels in chromatic aberration correction=ABLRVL;

Horizontal upper limit of Gr/Gb pixels in chromatic aberration correction=ABLGHU;

Horizontal lower limit of Gr/Gb pixels in chromatic aberration correction=ABLGHL;

Vertical upper limit of Gr/Gb pixels in chromatic aberration correction=ABLGVU;

Vertical lower limit of Gr/Gb pixels in chromatic aberration correction=ABLGVL;

Horizontal upper limit of B pixels in chromatic aberration correction=ABLBHU;

Horizontal lower limit of B pixels in chromatic aberration correction=ABLBHL;

Vertical upper limit of B pixels in chromatic aberration correction=ABLBVU; and

Vertical lower limit of B pixels in chromatic aberration correction=ABLBVL.

(Second Related Parameter Group)

Figure 9A:
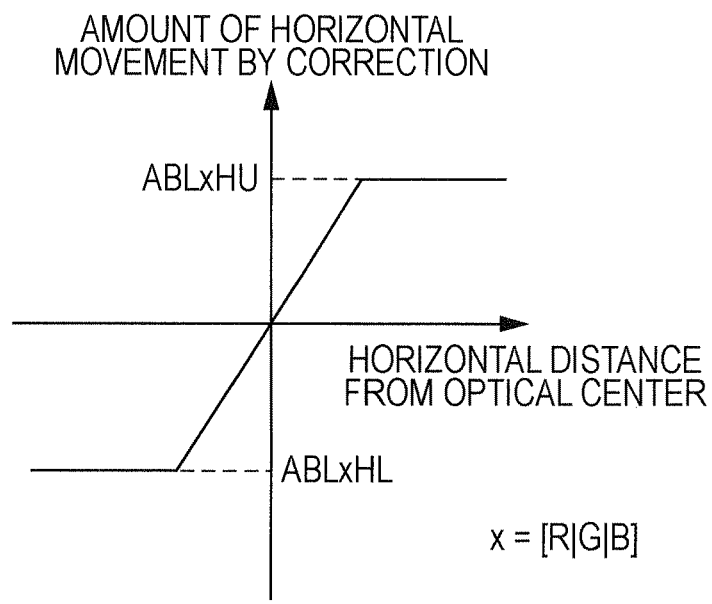
FIGS. 9A and 9B illustrate an exemplary amount of movement after clipping.
Figure 9B:
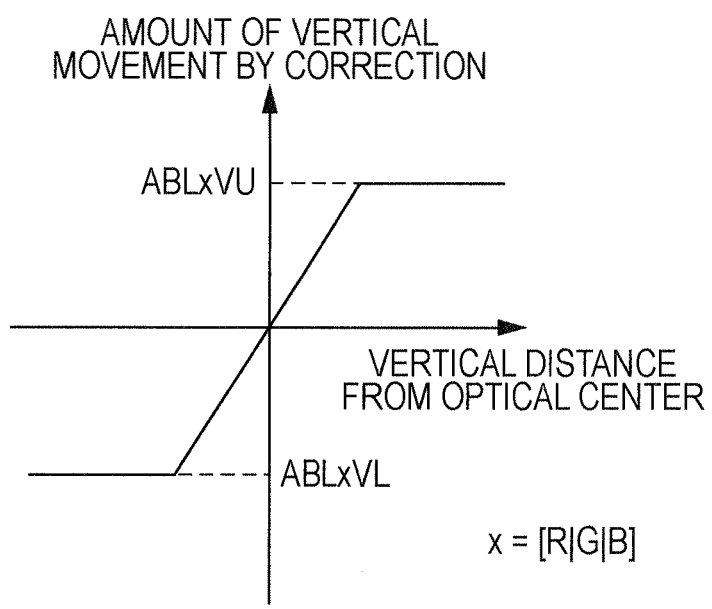

FIG. 9 illustrates an exemplary amount of movement after clipping. FIG. 9A illustrates horizontal upper and lower limits, (horizontal threshold values) ABLxHU and ABLxHL (x=[R|G|B]), relative to the amount of horizontal movement by the correction. FIG. 9B illustrates vertical upper and lower limits, (vertical threshold values) ABLxVU and ABLxVL (x=[R|G|B]), relative to the amount of vertical movement by the correction.

In the clipping of the amount of movement, the horizontal component and the vertical component of the amount of movement by the linear correction are clipped with the corresponding upper limits and lower limits. The horizontal component of the amount of movement, by the linear correction after the clipping, is clipped to the amount of movement by the linear correction (horizontal component) in a range [ABLxHL, ABLxHU] (x=[R|G|B]). The vertical component of the amount of movement by the linear correction after the clipping is clipped to, the amount of movement by the linear correction (vertical component) in a range [ABLxVL, ABLxVU] (x=[R|G|B]).

Referring back to FIG. 5, in operation S104, the corner correction part 34 determines that the target pixel is in the second area, if the sum of the horizontal and vertical distances from the optical center to the target pixel is substantially equal to or larger than a corner threshold value, and calculates the horizontal component and the vertical component of the amount of movement by the linear correction, using the second linear function. The second linear function is a function, using the difference from the corner threshold value as a parameter, and is defined by gain factors, for example, gradients, that are different from those of the first linear function.

Related parameters used in the calculation of the amount of movement by the linear correction are as follows:

Corner threshold value of R pixels in chromatic aberration correction=ABNLTHR;

Corner threshold value of Gr/Gb pixels in chromatic aberration correction=ABNLTHG;

Corner threshold value of B pixels in chromatic aberration correction=ABNLTHB;

Corner gain factor of R pixels in chromatic aberration correction=ABNLGAR;

Corner gain factor of Gr/Gb pixels in chromatic aberration correction=ABNLGAG; and Corner gain factor of B pixels in chromatic aberration correction=ABNLGAB.

(Third Related Parameter Group)

The corner correction part 34 performs corner correction for reducing the coloration, on the amount of movement, by the linear correction after the clipping at the four corners of the image, shifted from the amount of aberration due to the linear correction. FIG. 10 illustrates an exemplary corner correction target areas. The corner correction target areas, illustrated in FIG. 10, include areas at the four corners of the image defined by the corner correction boundary, for example, the corner threshold value. The areas at the four corers of the image correspond to, for example, the second area. Hatched areas illustrated in FIG. 10 may be the second area and the remaining area may be the first area.

Whether the target pixel is included in the corner correction target area, for example, in the second area, or not, is determined based on the difference between a corner threshold value ABNLTHx: x=[R|G|B] and the sum of the absolute values of the distances from the optical center. The target pixel is included in the corner correction target area if the difference from the corner threshold value ≥0, according to Equation (5), and the target pixel is not included in the corner correction target area if the difference from the corner threshold value <0, according to Equation (5):

Difference from corner threshold value=$abs(cpH-ABOAH)+abs(cpV-ABOAV)-ABNLTHx(x=[R|G|B])$ (5)

where "abs( )" denotes the absolute value calculation. If it is determined that the target pixel is included in the corner correction target area, the amount of corner correction is calculated according to Equation (6):

Amount of corner correction=Difference from threshold value$\times ABNLGAx(x=[R|G|B])$ (6)

where $ABNLGAx$ (x=[R|G|B]) denotes the gain factor of the second linear function. If it is determined that the target pixel is included in the corner correction target area, the amount of corner correction is substantially equal to zero (e.g. the amount of corner correction=0), and an unsigned amount of corner correction is calculated.

The amount of movement after the corner correction is calculated by multiplying the amount of corner correction by a quadrant determination factor, defined by the quadrant to which the target pixel belongs, and adding the horizontal component and the vertical component, of the amount of movement by the linear correction after the clipping, to the result of the multiplication according to Equations (7) and (8)

Horizontal component of amount of movement after corner correction=horizontal component of amount of movement by linear correction after clipping+amount of corner correction×quadrant determination factor(horizontal component) (7)

Vertical component of amount of movement after corner correction=vertical component of amount of movement by linear correction after clipping+amount of corner correction×quadrant determination factor(vertical component) (8)

Figure 11:
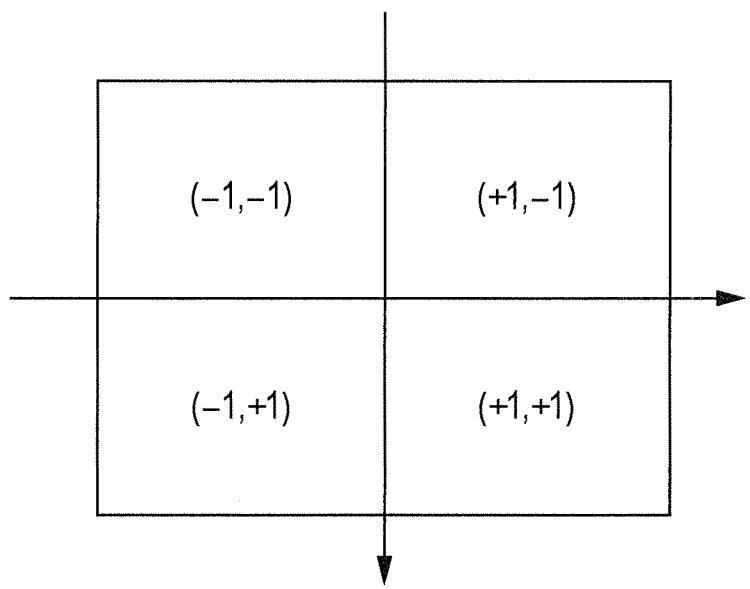
FIG. 11 illustrates exemplary quadrant determination factors.

FIG. 11 illustrates exemplary quadrant determination factors. The quadrant determination factors, illustrated in FIG. 11, are used to determine the sign of the amount of corner correction, for example, the gradient of the second linear function of the horizontal components, and the vertical components of the first to fourth quadrants.

Figure 12A:
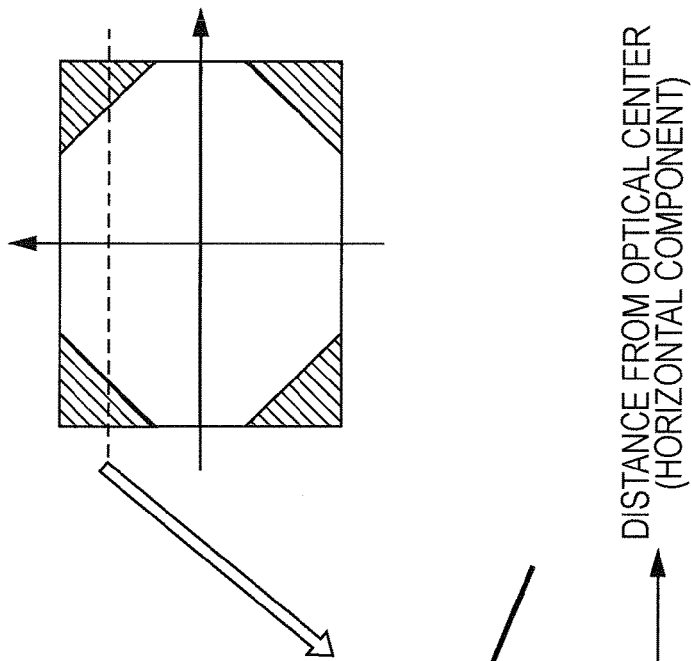
FIGS. 12A and 12B illustrate an exemplary corner correction.
Figure 12B:
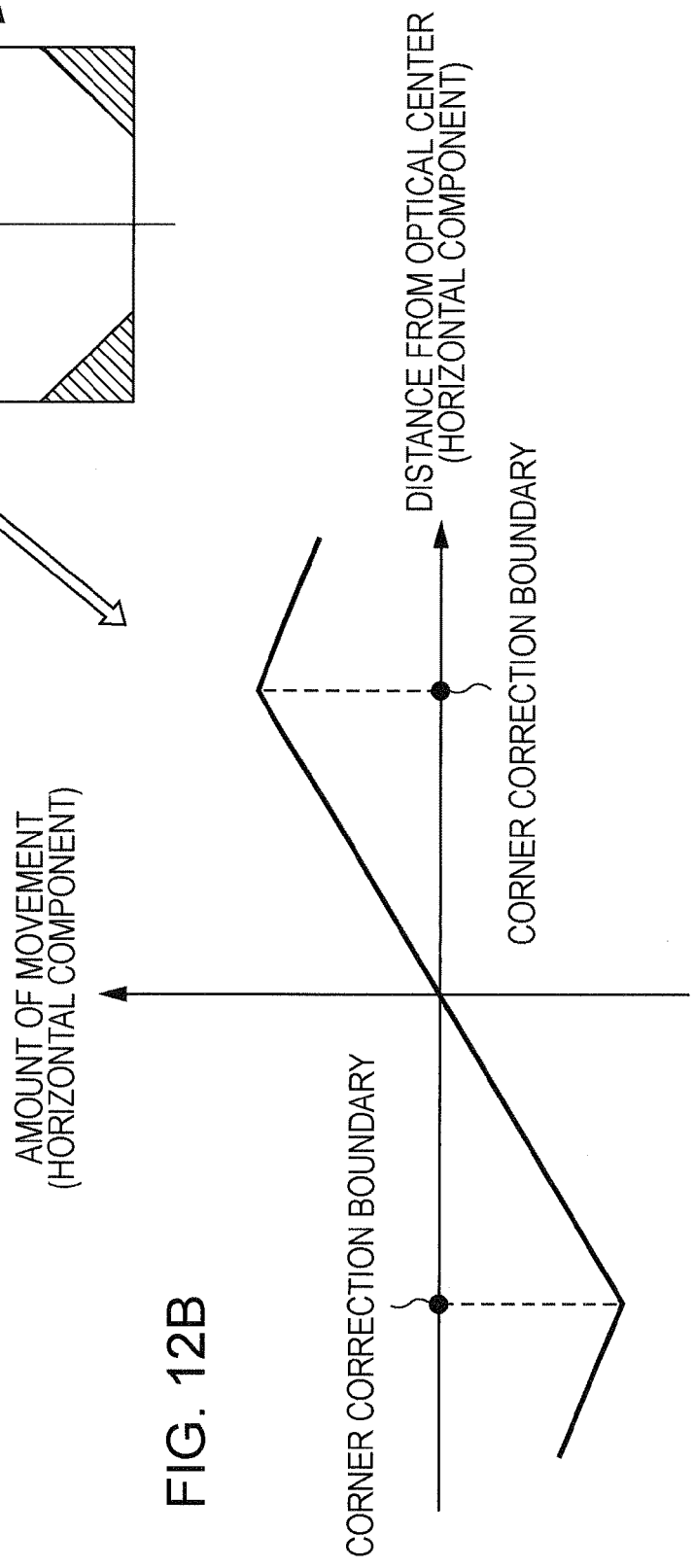

FIG. 12 illustrates an exemplary corner correction. The corner correction illustrated in FIGS. 12A and 12B may be performed by the corner correction part 34, illustrated in FIG. 4. The clipping may not be performed in the corner correction, illustrated in FIGS. 12A and 12B.

FIG. 12B illustrates an amount of movement relative to the distance from the optical center. For example, FIG. 12B illustrates how the horizontal component is varied, on a horizontal line across the corner correction target areas at the four corners of the image, illustrated in FIG. 12A. The amount of movement in a segment from the optical center to the corner correction boundary is varied depending on the gain factor, for example, the gradient ABGAx: x=[R|G|B] of the first linear function. The amount of movement in a segment away from the optical center, over the corner correction boundary, is varied depending on the gain factor ABNLGAx: x=[R|G|B] of the second linear function, and the quadrant determination factor.

Referring back to FIG. 5, in operation S105, the bilinear interpolator 35 performs bilinear interpolation on the coordinate given by adding the amount of movement by the linear correction after the clipping and the amount of corner correction to the coordinate of the target pixel in operations S101 to S104. Four pixels of the same color on the Bayer array near the resulting coordinate are selected and the bilinear interpolation is performed on the selected pixels, to calculate the pixel values subjected to the chromatic aberration correction. The bilinear interpolation includes weighted averaging based on the distances to the coordinates of the four pixel values.

The pixels of substantially the same color on the Bayer array includes R, Gr, Gb, and B pixels. The Gr pixel is treated as a pixel different from the Gb pixel. The bilinear interpolation is separately performed on four pixels near the Gr pixel, and on four pixels near the Gb pixel. As illustrated in FIG. 4, the line delay part 36 is provided upstream of the bilinear interpolator 35. The line delay part 36 includes storage means, such as a random access memory (RAM). The line delay part 36 temporarily stores the Bayer signals corresponding to multiple lines, and outputs the Bayer signals corresponding to multiple lines for the bilinear interpolation.

In operation S106, the bilinear interpolator 35 replaces the pixel value of the target pixel with the pixel value resulting from the bilinear interpolation. After the chromatic aberration correcting process from S101 to S106 has been performed on all the pixels on the Bayer array, the Bayer signals, subjected to the chromatic aberration correction, are supplied to the interpolation portion 23.

Figure 13A:
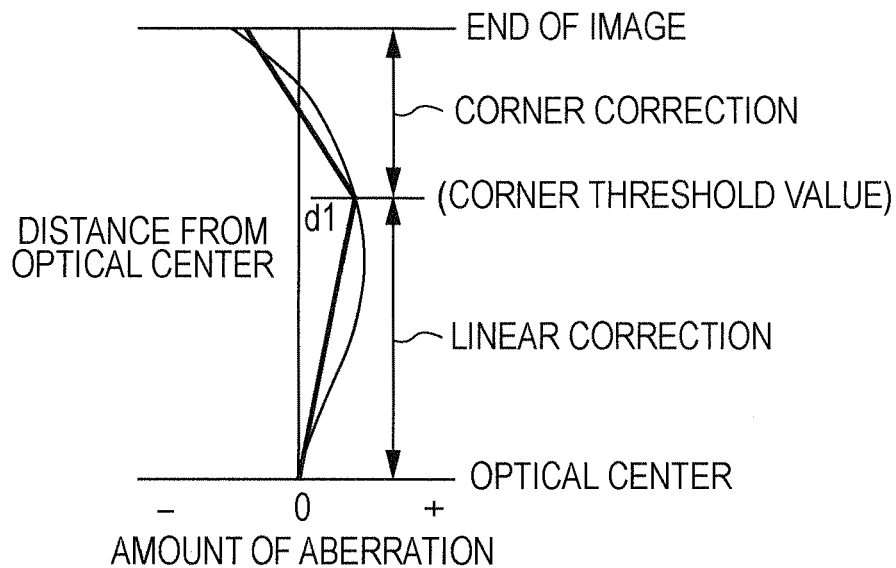
FIGS. 13A and 13B illustrate exemplary correction characteristic.

FIG. 13 illustrates exemplary correction characteristic. In FIG. 13A, for example, the clipping by the amount-of-movement clipping part 33, in FIG. 4, is not performed.

Figure 13B:
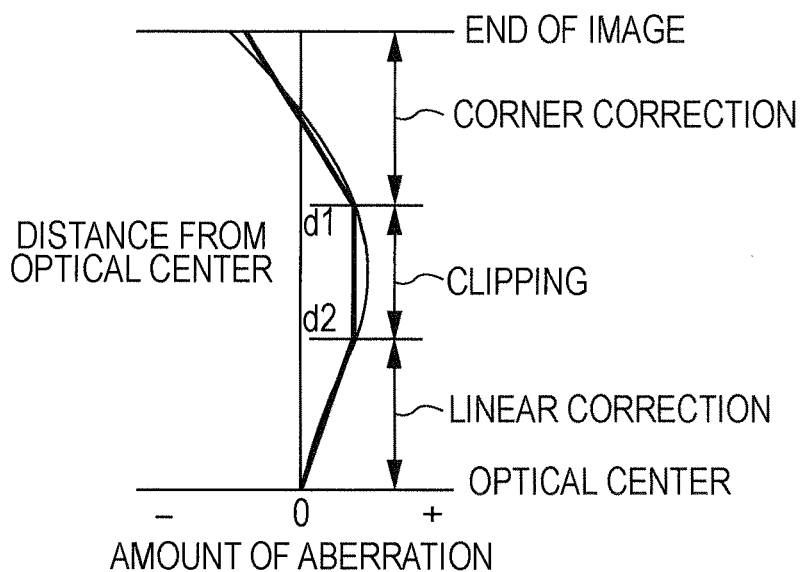

In FIG. 13B, the non-linear amount-of-aberration characteristic is approximated by using a linear function. Accordingly, the amounts of aberration of pixels, relatively apart from the optical center, are shifted from the actual amounts of aberration, and the chromatic aberration correction may not be appropriately performed in parts near the four corners of the image. In contrast, in FIG. 13A, the amount of movement by the linear correction is corrected by using the second linear function on the target pixel apart from the optical center by a distance longer than a distance d1 from the optical center, corresponding to the corner threshold value. Since the chromatic aberration correction is performed by using the second linear function, close to the amount-of-aberration characteristic in peripheral parts of the image, apart from the optical center, the correction characteristic becomes more close to the amount-of-aberration characteristic, thereby achieving more appropriate correction.

The correction characteristic is made close to the amount-of-aberration characteristic by setting the gain factors (gradients) of the first linear function in the first related parameter group and the corner threshold values, and the gain factors (gradients) of the second linear function in the third related parameter group. The related parameter values may be adjusted by measuring, in advance, the amount-of-aberration characteristic of the lens used in the apparatus. For example, the corner threshold value may be the distance d1 from the optical center when the shift of the linear correction characteristic, from the amount-of-aberration characteristic, is substantially equal to zero, after becoming substantially equal to zero and increasing.

In the example in FIG. 13B, the clipping by the amount-of-movement clipping part 33 in FIG. 4 is performed. The amount of movement by the correction of the target pixel in a segment from a distance d2 from the optical center, corresponding to the threshold value in the clipping, to the distance d1 from the optical center, corresponding to the corner threshold value, may be substantially constant. The correction characteristic using a third linear function having a gain factor (gradient) of zero is also applied in the segment from the distance d2 to the distance d1 to cause the correction characteristic to be more close to the amount-of-aberration characteristic by using the three linear functions. The correction characteristic becomes close to the amount-of-aberration characteristic, regardless of the distance from the optical center, thereby achieving more appropriate correction.

According to the previous aspects, the amount of hardware (e.g. the amount of calculation) is decreased to reduce the cost. According to the previous aspects, the calculation in the chromatic aberration correction is performed on the orthogonal coordinate system and the horizontal amount of shift by the chromatic aberration and the vertical amount of shift by the chromatic aberration are calculated based on the first linear function or the second linear function.

Since the chromatic aberration correction is performed by the four rules of arithmetic excluding subtraction in the previous aspects, the calculation unit may be simplified. Since each parameter in the first to third related parameter groups is set in advance, in accordance with the lens that is used and the image capturing conditions, the capacity of an amount-of-aberration characteristic table may be reduced. Accordingly, the amount of hardware (e.g. the amount of calculation) is decreased to reduce the cost.

For example, if a zoom lens is used, the correction characteristic varies, illustrated in FIGS. 13A and 13B, since the lens and the focus distance in the image capturing conditions are varied. For example, the signal processing unit 13 varies the first linear function and the second linear function in accordance with the zoom operation of the zoom lens when receiving a notification of the zoom control from the controller 17, illustrated in FIG. 2. Accordingly, even if the image capturing conditions are varied, the chromatic aberration correction is appropriately performed.

The chromatic aberration correcting portion 22, illustrated in FIG. 3, may be included in the interpolation portion 23. The chromatic aberration correcting portion 22 included in the interpolation portion may perform the chromatic aberration correction and the demosaicing, for example, the image interpolation.

In the demosaicing, for example, the image interpolation, single-color pixel data of red (R), green (G), or blue (B) is generated based on the Bayer data having the value of one of R, G, and B for every pixel in the array. Since the G pixels are arranged in a checkered pattern, and the R and B pixels are arranged in a grid pattern in the Bayer array, the value of a missing R, G, or B pixel is interpolated with the values of surrounding pixels in order to generate the single-color pixel data.

The interpolation portion 23 performs the demosaicing on the Bayer signal, subjected to the chromatic aberration correction, generated in the chromatic aberration correcting portion 22. The interpolation portion 23 may perform, for example, linear interpolation. Since the G pixels arranged in a checkered pattern exist on the left, right, top, and bottom of the missing R or B pixel to be interpolated, the average of the values of the four G pixels on the left, right, top, and bottom of the missing R or B pixel, is set as the value of the missing pixel.

The R or B pixels arranged in a grid pattern are diagonally, horizontally, or vertically adjacent to the missing R or B pixel to be interpolated. If the R or B pixel is diagonally adjacent to the missing R or B pixel to be interpolated, the average of the values of the four pixels of the same color diagonally adjacent to the missing R or B pixel is set as the value of the missing pixel. If the R or B pixels are horizontally adjacent to the missing R or B pixel to be interpolated, the average of the values of the two pixels, of the same color horizontally adjacent to the missing R or B pixel, is set as the value of the missing pixel. If the R or B pixels are vertically adjacent to the missing R or B pixel to be interpolated, the average of the values of the two pixels of the same color vertically adjacent to the missing R or B pixel is set as the value of the missing pixel.

The values of the R, G (Gr/Gb), and B pixels on the Bayer array, subjected to the chromatic aberration correction, may be calculated by the bilinear interpolation in the bilinear interpolator 35, illustrated in FIG. 4. In the interpolation of the pixel value, the value of a missing pixel of a color that is different from that of the target pixel on the Bayer array is interpolated based on the surrounding pixels of the same color, at positions where the amounts of shift of pixels of different colors, calculated by the chromatic aberration correcting portion 22, are taken into consideration. The interpolation is performed based on the coordinate (the coordinate after the movement) given by adding the amount of movement by the linear correction after the clipping and the amount of corner correction to the coordinate of the target pixel calculated in operations S101 to S104 in FIG. 5.

Figure 14A:
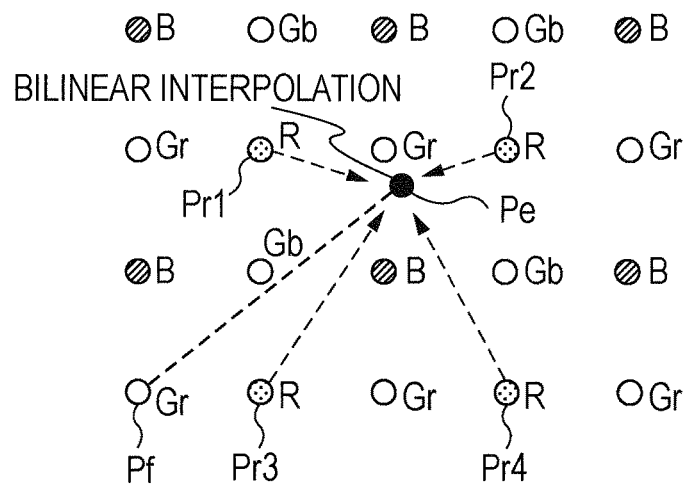
FIGS. 14A and 14B illustrate an exemplary demosaicing.

FIGS. 14A and 14B and FIGS. 15A and 15B illustrate an exemplary demosaicing. In FIGS. 14A and 14B and FIGS. 15A and 15B, the bilinear interpolation is performed on the value of a missing pixel. FIG. 14A illustrates an example in which, for example, the target pixel of the chromatic aberration correction is a Gr pixel in the generation of the single-color pixel data of R. The value of the R pixel for a target pixel Pf (Gr pixel) is calculated by the bilinear interpolation of four R pixels, Pr1 to Pr4, around a coordinate Pe obtained after the movement by the chromatic aberration correction, for example, by the weighted averaging based on the distances from the four pixels to the resulting coordinate Pe.

Figure 14B:
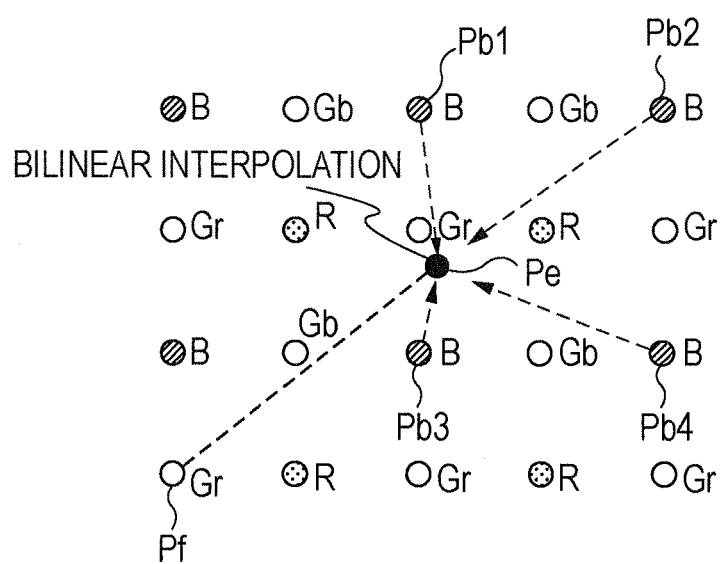

FIG. 14B illustrates an example in which, for example, the target pixel of the chromatic aberration correction is a Gr pixel, in the generation of the single-color pixel data of B. The value of the B pixel for the target pixel Pf (Gr pixel) is calculated by the bilinear interpolation of four B pixels Pb1 to Pb4 around the coordinate Pe obtained after the movement by the chromatic aberration correction.

Figure 15A:
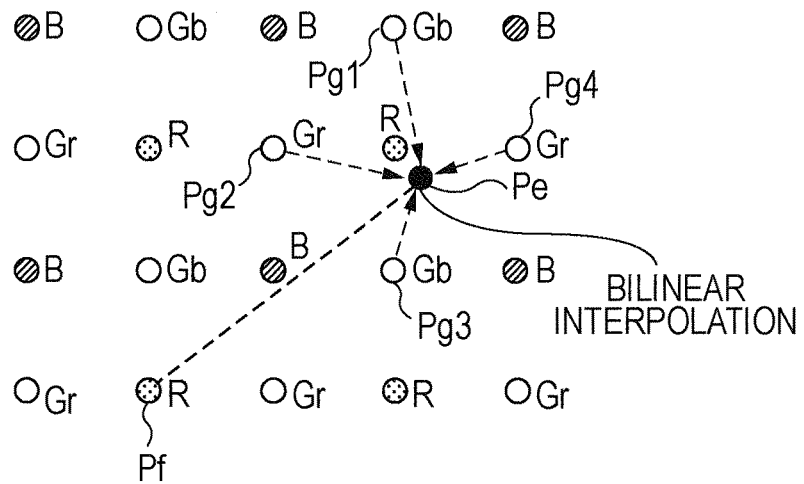
FIGS. 15A and 15B illustrate another exemplary demosaicing.

FIG. 15A illustrates an example in which, for example, the target pixel of the chromatic aberration correction is an R pixel in the generation of the single-color pixel data of G. The value of the G pixel for the target pixel Pf (R pixel) is calculated by the bilinear interpolation of four G (Gr/Gb) pixels Pg1 to Pg4 around the coordinate Pe obtained after the movement by the chromatic aberration correction.

Figure 15B:
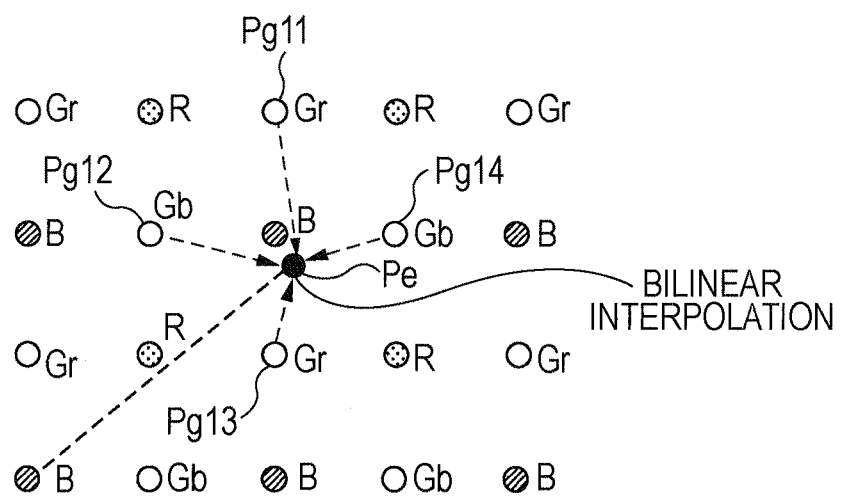

FIG. 15B illustrates an example in which, for example, the target pixel of the chromatic aberration correction is a B pixel in the generation of the single-color pixel data of G. The value of the G pixel for the target pixel Pf (B pixel) is calculated by the bilinear interpolation of four G (Gr/Gb) pixels Pg11 to Pg14 around the coordinate Pe obtained after the movement by the chromatic aberration correction.

The pixel values subjected to the chromatic aberration correction for the R, G (Gr/Gb), and B pixels on the Bayer array are calculated by the bilinear interpolation on the coordinate calculated in operations S101 to S104 in FIG. 5. In the generation of the single-color pixel data of each of R, G, and B, the value of a missing pixel of a color that is different from that of the target pixel on the Bayer array is interpolated based on the values of the pixels of the same color around the coordinate calculated in operations S101 to S104.

Since a new interpolator, for the bilinear interpolation of the value of a missing pixel, may not be needed because the bilinear interpolator 35, in the chromatic aberration correcting portion 22, performs the bilinear interpolation of the value of a missing pixel, the size of hardware is decreased.

Figure 16:
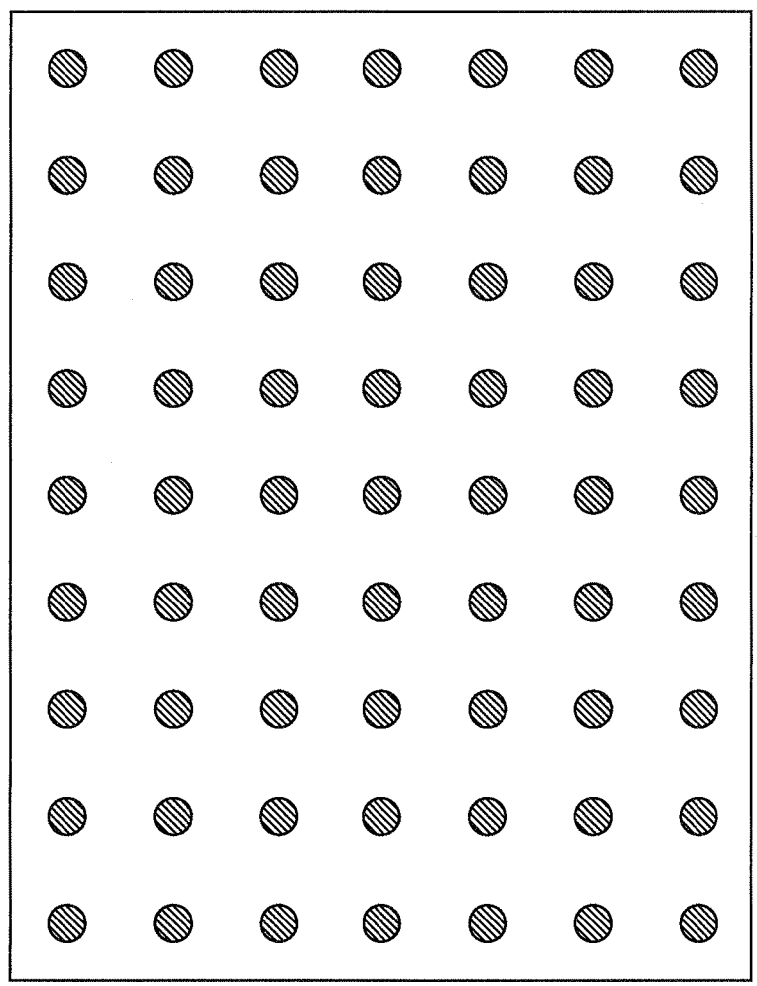
FIG. 16 illustrates an exemplary chromatic-aberration characteristics measurement chart.
Figure 17:
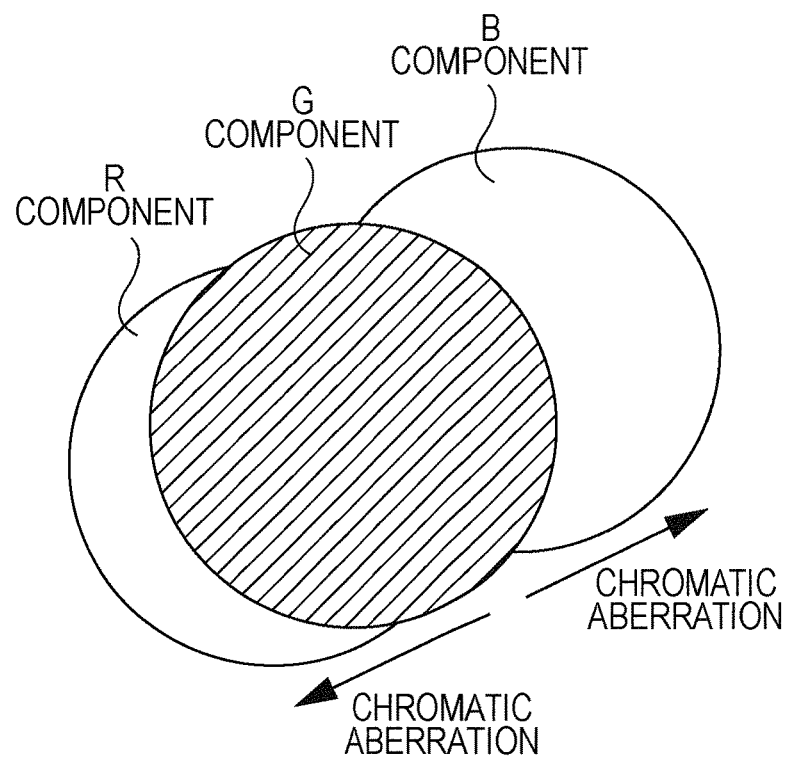
FIG. 17 illustrates another exemplary chromatic-aberration characteristics measurement chart.

FIG. 16 and FIG. 17 illustrate exemplary chromatic-aberration characteristics measurement charts. In FIG. 17, the chromatic aberration may be expanded. The gain factors (gradients) of the first linear function in the first related parameter group and the corner threshold values, and the gain factors (gradients) of the second linear function in the third related parameter group are adjusted by measuring in advance the amount-of-aberration characteristics of the lens used in the apparatus.

The amount-of-aberration characteristics are measured by using, for example, the chart illustrated in FIG. 16. Images of small black circles arranged in a grid pattern on a color background in FIG. 16 are captured under given image capturing conditions, for example, a given zoom magnification, given lighting, or a given amount of aperture. As illustrated in FIG. 17, how much the small circles of the R component, the G component, and the B component are shifted from the captured image data is measured. Accordingly, the chromatic aberration characteristics at the coordinate position of each small circle under the given image capturing conditions is obtained.

The related parameter values, for example, the gain factors of the first linear function, the corner threshold values, or the gain factors of the second linear function, are set so that the chromatic aberration characteristics given by the measurement are corrected to the greatest extent. For example, the related parameter values are set so that the sum of the correction errors of all the small circles is minimized. The correction error means a shift between the ideal value of the coordinate of each circle in the chromatic-aberration characteristics measurement chart, and the value thereof after the correction. The related parameter values may be calculated by numerical analysis with a calculator.

Although the Bayer data is used as the captured image data, processed in the signal processing unit 13, in the previous aspects, the captured image data may be data in another array, as long as the captured image data is RAW data before the pixel interpolation. For example, the captured image data may be data in a honeycomb array. Alternatively, a double Bayer format or an improved Bayer format may be applied to the captured image data.

Example aspects of the present invention have now been described in accordance with the above advantages. It will be appreciated that these examples are merely illustrative of the invention. Many variations and modifications will be apparent to those skilled in the art.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The invention claimed is:

1. An image processing apparatus comprising:
    an image pickup circuit configured to perform photoelectric conversion on an optical image; and
    a chromatic aberration correcting circuit configured to calculate an amount of shift by chromatic aberration, based on a linear function to perform chromatic aberration correction on captured image data in a quadrangular area in accordance with the amount of shift,
    wherein the chromatic aberration correcting circuit performs the chromatic aberration correction on a first pixel in a first area including an optical center of the captured image data with a first linear function using a distance from the optical center and performs the chromatic aberration correction on a second pixel in a second area that does not include the optical center and that is different from the first area with a second linear function using the distance from the optical center,
    wherein the chromatic aberration correcting circuit performs the chromatic aberration correction in each quadrant around the optical center using the first linear function if the sum of a horizontal distance and a vertical distance from the optical center to the first pixel is smaller than a given threshold value and using the second linear function if the sum of the horizontal distance and the vertical distance is substantially equal to or larger than the given threshold value,
    wherein the second area in which the second linear function is used includes only four areas each of which is provided at a respective corner of the quadrangular area and each of the four areas has a substantially equal shape.

2. The image processing apparatus according to claim 1, wherein the chromatic aberration correcting circuit uses an orthogonal coordinate system to calculate a horizontal component and a vertical component of the amount of shift based on the first linear function or the second linear function.

3. The image processing apparatus according to claim 1, wherein the chromatic aberration correcting circuit divides the first area into two subareas by a borderline between the optical center and the boundary between the first area and the second area and sets the amount of shift of a third pixel in the subarea toward the second area to a certain value.

4. The image processing apparatus according to claim 3, wherein, if a horizontal distance and a vertical distance from the optical center to the first pixel exceed a horizontal threshold value and a vertical threshold value, respectively, the chromatic aberration correcting circuit sets an amount of horizontal shift and an amount of vertical shift of the first pixel as the amounts of shift corresponding to the horizontal threshold value and the vertical threshold value horizontally and vertically calculated based on the first linear function.

5. The image processing apparatus according to claim 4, wherein the first linear function and the second linear function, the borderline, or the horizontal threshold value and the vertical threshold value are set in accordance with a lens in an imaging optical system and image capturing conditions.

6. The image processing apparatus according to claim 1, wherein the first linear function and the second linear function are set in accordance with a lens in an imaging optical system and image capturing conditions.

7. The image processing apparatus according to claim 1, wherein the captured image data is raw data before a pixel interpolation.

8. An image processing method comprising:
calculating an amount of shift by chromatic aberration, based on a linear function;
performing chromatic aberration correction on captured image data in a quadrangular area based on the amount of shift;
performing the chromatic aberration correction on a first pixel in a first area including an optical center with a first linear function using a distance from the optical center; and
performing the chromatic aberration correction on a second pixel in a second area that does not include the optical center and that is different from the first area, with a second linear function using the distance from the optical center,
wherein the chromatic aberration correction is performed in each quadrant around the optical center using the first linear function if the sum of a horizontal distance and a vertical distance from the optical center to the first pixel is smaller than a given threshold value and using the second linear function if the sum of the horizontal distance and the vertical distance is substantially equal to or larger than the given threshold value,
wherein the second area in which the second linear function is used includes only four areas each of which is provided at a respective corner of the quadrangular area and each of the four areas has a substantially equal shape.

9. The image processing method according to claim 8, wherein an orthogonal coordinate system is used to calculate a horizontal component and a vertical component of the amount of shift by the chromatic aberration based on the first linear function or the second linear function.

10. The image processing method according to claim 8, wherein the first area is divided into two subareas by a borderline between the optical center and the boundary between the first area and the second area and the amount of shift of a third pixel in the subarea toward the second area is set to a certain value.

11. The image processing method according to claim 10, wherein, if a horizontal distance and a vertical distance from the optical center to the first pixel exceed a horizontal threshold value and a vertical threshold value, respectively, a amount of horizontal shift and a amount of vertical shift of the first pixel are set as the amounts of shift corresponding to the horizontal threshold value and the vertical threshold value horizontally and vertically calculated based on the first linear function.

12. The image processing method according to claim 10, wherein the first linear function and the second linear function, the borderline, or the horizontal threshold value and the vertical threshold value are set in accordance with a lens in an imaging optical system and image capturing conditions.

13. The image processing method according to claim 8, wherein the first linear function and the second linear function are set in accordance with a lens in an imaging optical system and image capturing conditions.

14. A camera comprising:
an imaging sensor configured to generate captured image data;
a chromatic aberration correcting circuit configured to perform chromatic aberration correction on the captured image data in a quadrangular area;
a storage circuit configured to store the captured image data subjected to the chromatic aberration correction; and
a controller that includes the chromatic aberration correcting circuit,
wherein the chromatic aberration correcting circuit performs the chromatic aberration correction on a first pixel in a first area including an optical center of the captured image data with a first linear function using a distance from the optical center and performs the chromatic aberration correction on a second pixel in a second area that does not include the optical center and that is different from the first area with a second linear function using he distance from the optical center,
wherein the chromatic aberration correcting circuit performs the chromatic aberration correction in each quadrant around the optical center using the first linear function if the sum of a horizontal distance and a vertical distance from the optical center to the first pixel is smaller than a given threshold value and using the second linear function if the sum of the horizontal distance and the vertical distance is substantially equal to or larger than the given threshold value,
wherein the second area in which the second linear function is used includes only four areas each of which is provided at a respective corner of the quadrangular area and each of the four areas has a substantially equal shape.

15. The camera according to claim 14, wherein the chromatic aberration correcting circuit varies the first linear function or the second linear function based on a variation in image capturing conditions of the controller to perform the chromatic aberration correction.

* * * * *